US011811345B1

(12) United States Patent
Simms et al.

(10) Patent No.: US 11,811,345 B1
(45) Date of Patent: Nov. 7, 2023

(54) METHODS OF PROTECTING MOTORS DRIVEN BY VARIABLE FREQUENCY DRIVES AND VARIABLE FREQUENCY DRIVE SYSTEMS EMPLOYING THE SAME

(71) Applicant: Eaton Intelligent Power Limited, Dublin (IE)

(72) Inventors: Stan Rex Simms, Arden, NC (US); Thomas A. Farr, Candler, NC (US); Donovan Gray, Hendersonville, NC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/805,999

(22) Filed: Jun. 8, 2022

(51) Int. Cl.
*G01K 7/00* (2006.01)
*H02P 27/06* (2006.01)
*H02P 23/20* (2016.01)

(52) U.S. Cl.
CPC ............. *H02P 27/06* (2013.01); *H02P 23/20* (2016.02)

(58) Field of Classification Search
CPC ............ G01K 7/00; H02P 27/06; H02P 23/20
See application file for complete search history.

(56) References Cited

U.S. PATENT DOCUMENTS

| 4,587,474 A | 5/1986 | Espelage et al. |
|---|---|---|
| 6,329,776 B1 | 12/2001 | Bixel et al. |
| 6,339,309 B1 | 1/2002 | Bixel et al. |
| 6,384,565 B1 | 5/2002 | Bixel et al. |
| 7,081,735 B1 | 7/2006 | Malkowski et al. |
| 8,134,323 B2 | 3/2012 | Leung et al. |
| 10,033,322 B2 | 7/2018 | Gibbs et al. |
| 2016/0134224 A1* | 5/2016 | Bock .................. G01K 7/00 318/473 |
| 2017/0126164 A1* | 5/2017 | Gibbs .................. H02J 9/06 |

* cited by examiner

*Primary Examiner* — Cortez M Cook
(74) *Attorney, Agent, or Firm* — Stanek Lemon Crouse & Meeks, P.A.

(57) ABSTRACT

A converter of a variable frequency drive (VFD) is operated in a ramp-up mode to produce an AC output voltage for accelerating a motor. A loading of the converter is determined concurrent with the ramp-up mode. Transfer of the motor to a bypassed mode is conditioned on whether the determined loading in the ramp-up mode meets a criterion. In some embodiments, conditioning transfer to the bypassed mode comprises foregoing transition to the bypassed mode based on a comparison of the determined loading to an underloading threshold.

20 Claims, 3 Drawing Sheets

METHODS OF PROTECTING MOTORS DRIVEN BY VARIABLE FREQUENCY DRIVES AND VARIABLE FREQUENCY DRIVE SYSTEMS EMPLOYING THE SAME

BACKGROUND

The inventive subject matter relates to motor drive apparatus and methods and, more particularly, to variable frequency drive apparatus and methods.

Acceleration of an AC motor can cause large inrush currents and produce uncontrolled torque that can generate damaging mechanical shock. Accordingly, large motors are often started using a soft starter or a variable frequency drive (VFD). A soft starter reduces inrush current by limiting the voltage applied to the motor until the motor is up to speed. A VFD can provide even greater control by varying the output frequency to allow the motor to gradually be brought up to speed at rated torque.

In a typical VFD motor starting application, a converter of the VFD is used to ramp up the motor to the frequency of an AC power source, such as a utility feed. When the VFD converter is synchronized with the AC power source, a bypass switch is closed to directly couple the motor to the AC power source and the converter is disabled. Techniques for using a VFD as a motor starter are described, for example, in U.S. Pat. No. 10,033,322 to Gibbs et al.

SUMMARY

Some embodiments provide method of operating a variable frequency drive (VFD). The methods include operating a converter of the VFD in a ramp-up mode to produce an AC output voltage for accelerating a motor, determining a loading of the converter concurrent in the ramp-up mode, and conditioning transfer of the motor to a bypassed mode on whether the determined loading in the ramp-up mode meets a criterion. In some embodiments, conditioning transfer to the bypassed mode comprises foregoing transition to the bypassed mode based on a comparison of the determined loading to an underloading threshold.

In some embodiments, the underloading threshold may correspond to a level less than about 10% of a nominal load rating of the motor. In further embodiments, the underloading threshold may correspond to a level between about 5% and about 10% of the nominal load rating of the motor. In still further embodiments, the underloading threshold may vary with an output frequency of the converter. For example, the underloading threshold may correspond to level of about 5% of the nominal load rating at around a zero speed frequency and a level of about 10% of the nominal load rating at around a full speed frequency.

In some embodiments, the criterion may include a loading threshold. In further embodiments, the criterion may also include a duration of loading in a range defined by the loading threshold.

In some embodiments, conditioning transfer may include disabling the converter responsive to the determined loading failing to meet the criterion. The methods may further include indicating a fault responsive to the determined loading failing to meet the criterion.

Further embodiments comprise a system including a converter configured to drive a motor, a bypass switch configured to bypass the converter, and a control circuit configured to operate the converter in a ramp-up mode to produce an AC output voltage for accelerating the motor, to determine a loading of the converter in the ramp-up mode and to condition transfer of the motor to a bypassed mode on whether the determined loading in the ramp-up mode meets a criterion. The control circuit may be configured to forego transition to the bypassed mode based on a comparison of the determined loading to an underloading threshold.

DETAILED DESCRIPTION

Figure 1:
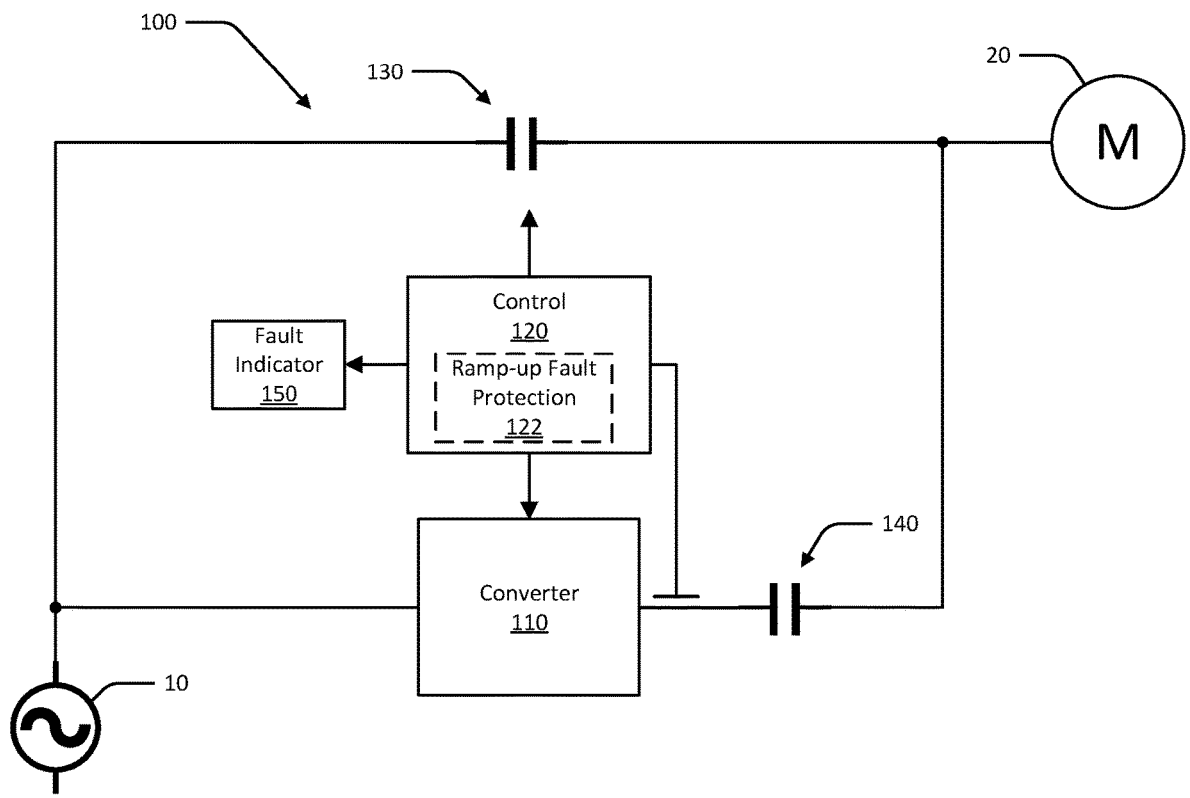
FIG. 1 illustrates apparatus for implementation of various embodiments of the inventive subject matter.

The inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises," "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Example embodiments herein with reference to block diagrams and/or flowchart illustrations. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a tangible or non-transitory computer-readable storage medium that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having tangible, non-transitory computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The terms "tangible" and "non-transitory" as used herein, are intended to describe a computer-readable storage medium (or "memory") excluding propagating electromagnetic signals but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

Some embodiments of the inventive concept arise from a realization that, in some VFD applications, wiling errors, open contactors and/or other conditions can cause lack of a proper connection of the converter of the VIA) to the motor. If the VFD attempts to ramp up the motor for line synchronization transfer without monitoring the output loading, the VFD controller may inadvertently close the bypass and apply full voltage to a motor that has not been properly brought up to speed. This can damage the motor or drive train and/or cause nuisance operation of motor protection elements (e.g., fuses, motor protection relays and like).

FIG. 1 illustrates a VFD apparatus 100 according to some embodiments. The apparatus 100 includes a converter circuit 110, which is configured to be connected to a motor 20 by an output contactor 140. The converter circuit 110 may include, for example, an inverter circuit that produces an AC output voltage and has an input coupled to a rectifier circuit that receives AC power from an AC power source 10, such as a utility feed. The apparatus 100 further includes a bypass contactor 130, which is configured to bypass the converter circuit 110 by directly connecting the motor 20 to the AC power source 10.

The converter circuit 110 and the bypass contactor 130 are controlled by a control circuit 120. In particular, the control circuit 120 may be configured to control the converter circuit 110 and the bypass contactor 130 to execute a ramp-up procedure wherein the converter circuit 110 is used to gradually accelerate the motor 20 by applying a voltage with a time-varying frequency and amplitude. After the output voltage produced by the converter circuit 110 reaches a point at which it is synchronized with a voltage produced by the AC power source 10, the control circuit 110 may actuate the bypass contactor 130 to directly connect the AC power source to the motor 20. At this point, the control circuit 110 may disable the converter circuit 110. Ramp-up techniques for using a VFD for motor starting along these lines are described, for example, in the aforementioned U.S. Pat. No. 10,033,322 to Gibbs et al., the disclosure of which is incorporated by reference herein in its entirety. Although not shown in FIG. 1, a current limiting reactor (not shown) may be coupled between the converter 110 and the output contactor 140 to reduce current that may be fed back to the converter circuit 110 if there is a mismatch between the output of the converter circuit 110 and the AC power source 10 if the output contactor 140 and the bypass contactor 130 are both simultaneously closed for a moment during the transfer process.

As illustrated, the control circuit 110 may further include a ramp-up fault protection circuit 122, which is configured to detect at least one condition associated with an improper connection between the converter circuit 110 and the motor 20 and to responsively prevent transition to the bypassed mode. In particular, in some embodiments, the ramp-up fault protection circuit 122 may be configured to detect an underloading condition during ramp-up that is indicative of a lack of a proper connection between the converter circuit 120 and the motor 20, which may be caused by, for example, the contactor 140 being in an open state and/or a miswiring between the converter circuit 110 and the contactor 140 and/or between the contactor 140 and the motor 20. The ramp-up fault protection circuit 122 may prevent application of full voltage to the motor 20 when the converter 110 has failed to properly bring the motor 20 up to speed. As shown, the control circuit 120 may be further configured to activate a fault indicator 150 (e.g., a visual and/or audio indication)

responsive to the ramp-up fault protection circuit 122 identifying such a fault condition.

It will be appreciated that the control circuit 120 may be implemented using any of a variety of digital and/or analog circuits. For example, the control circuit 120 may be implemented using data processing circuit, such as a microcontroller or similar device and associated peripheral circuitry, such as memory devices, input/output devices, analog/digital conversion devices and the like. Such data processing circuitry device may be configured to execute computer program instructions that implement control operations as described herein. The ramp-up fault protection circuit 122 may be implemented by such a data processing circuitry executing computer program instructions that implement ramp-up fault protection operations as described herein. It will be further appreciated that some embodiments may employ analog and/or discrete digital circuitry that similarly performs such operations.

Figure 2:
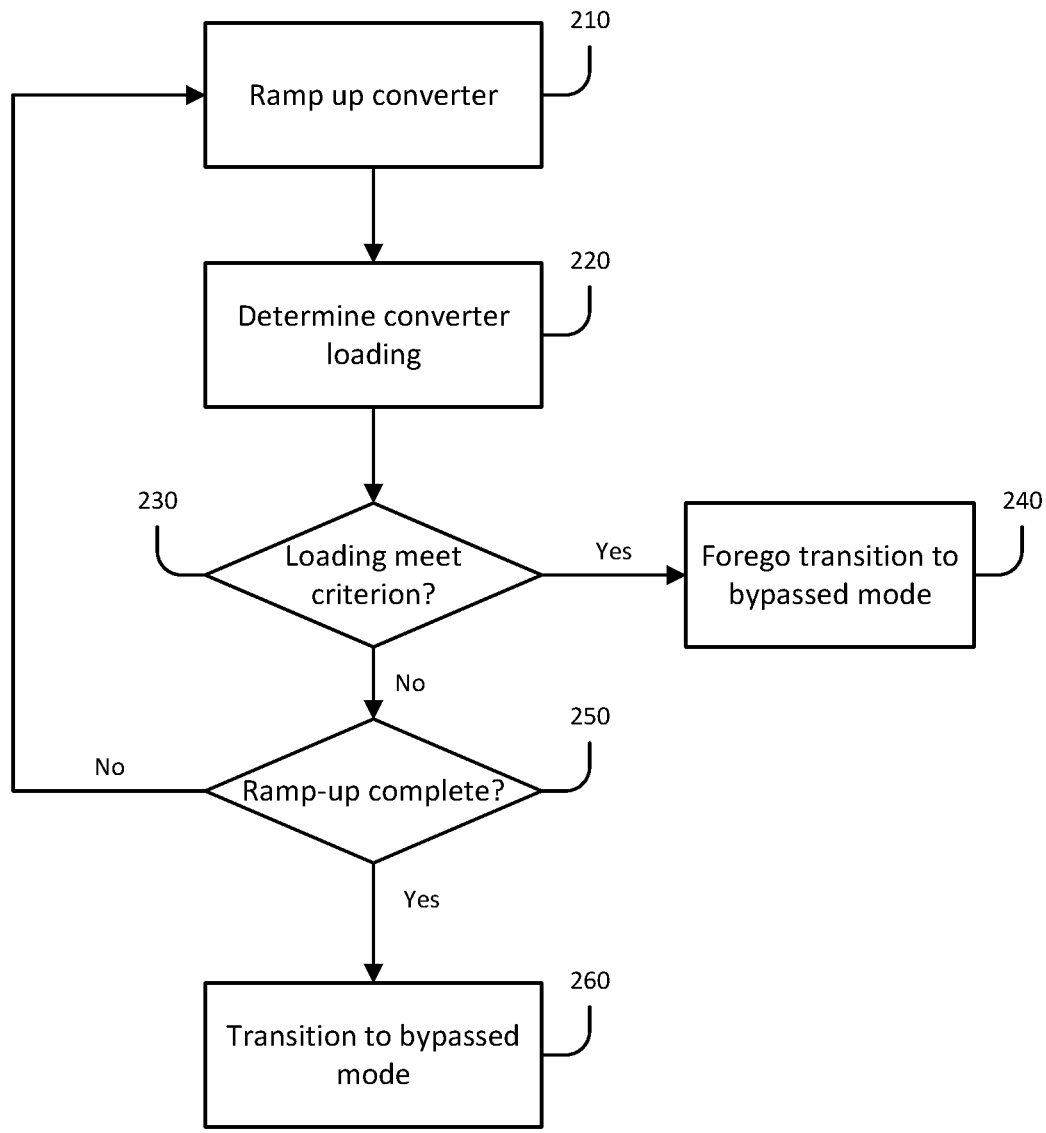
FIG. 2 is a flowchart illustrating operations of the apparatus of FIG. 1 according to some embodiments.

FIG. 2 is a flowchart illustrating operations that may be performed by the control circuit 120 of FIG. 1 according to some embodiments. The control circuit 210 initiates a ramp-up procedure wherein the frequency and amplitude of the voltage produced by the converter circuit 110 is ramped up (block 210). During the ramp up, a loading of the converter circuit 110 is determined (block 220). This may include, for example, determining an output current and/or output power of the converter circuit 110 using sensors at the output of the converter circuit 110. If the determined loading meets a criterion indicative of a failed connection between the converter circuit 110 and the motor, further transition to bypass is foregone. For example, in response to the loading meeting the criterion, the converter circuit 110 may be disabled and the bypass contactor 130 maintained in an open state (blocks 230, 240). If the criterion is not met, however, the ramp up may continue until complete, at which point the apparatus transitions to a bypassed state by closing the bypass contactor 130 to directly connect the motor 20 to the AC power source (blocks 250, 260).

Figure 3:
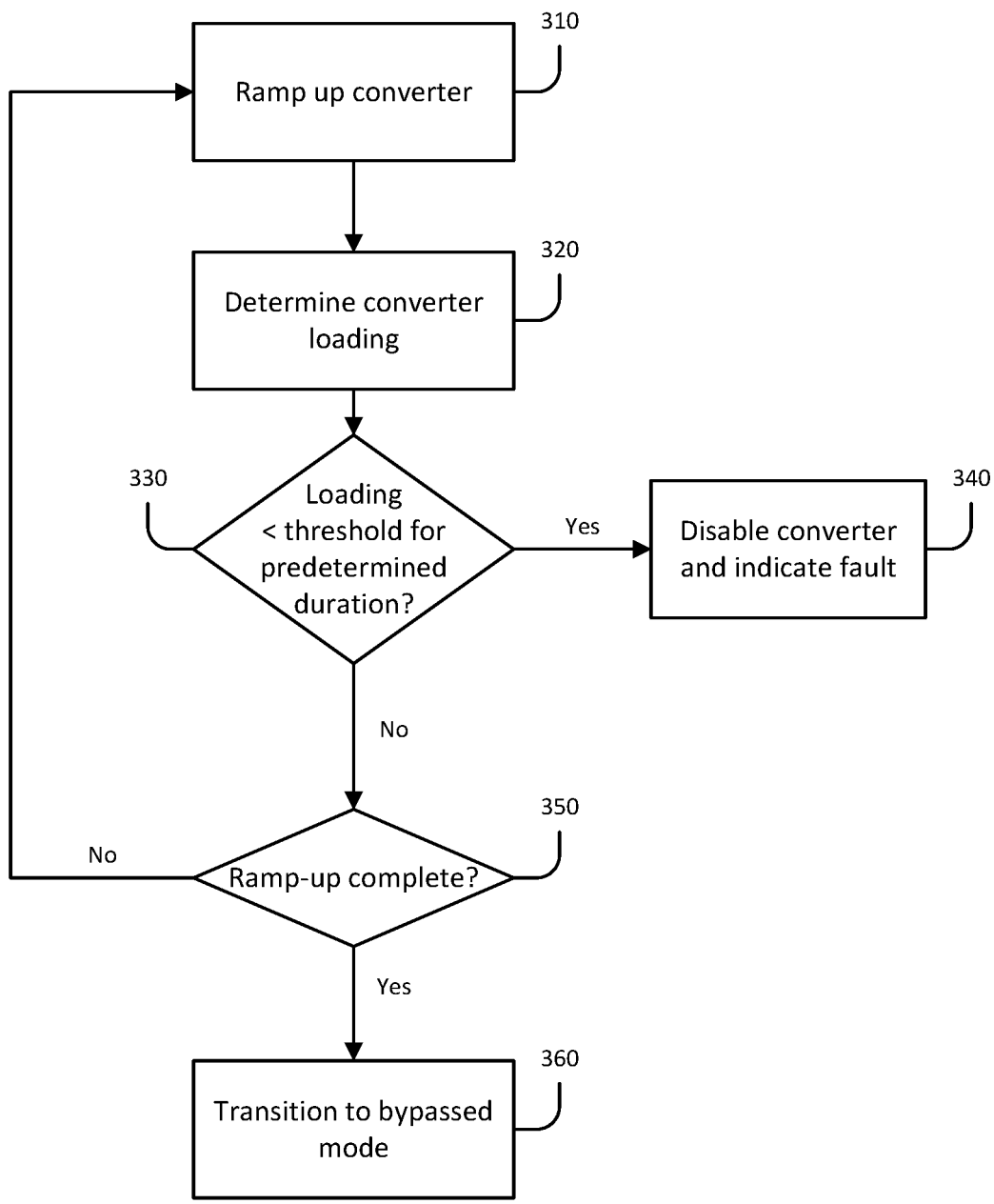
FIG. 3 is a flowchart illustrating operations of the apparatus of FIG. 1 according to some embodiments.

According to some embodiments, ramp-up fault protection may involve comparing loading of the converter circuit 110 to a predetermined threshold. For example, as shown in FIG. 3, operations of the apparatus 100 of FIG. 1 may include ramping up the frequency and amplitude of the voltage produced by the converter circuit 110 (block 310) while determining a loading of the converter circuit 110 (block 320). If the determined loading is less than a predetermined threshold for a predetermined duration, the control circuit 120 disables the converter circuit 110 and generates a fault indication (blocks 330, 340). If not, ramp up may continue until complete, at which point the apparatus transitions to a bypassed state by closing the bypass contactor 130 to directly connect the motor 20 to the AC power source (blocks 350, 360).

The predetermined loading threshold may be, for example, a loading corresponding to a certain percentage of a nominal load rating of the motor. For example, the threshold may be around 10% or less of a rated full load amperes (FLA), a rated stator power of the motor, or a rated stator electromagnetic torque of the motor. For example, a motor may have nameplate ratings of 4000 volts, 629 amps, 1758 rpm, 0.882 power factor and 0.956 efficiency, corresponding to a nominal rated torque of 19659 N-m at full-load rated speed. The underload threshold for such a motor could be set at around 1.0% of this nominal rated torque value. In further embodiments, however, an underload threshold may be in terms of other parameters that indicate loading, such as current or power.

The threshold may also vary with the frequency of the converter output voltage. For example, in some embodiments, an underloading threshold may vary from around 5% of the nominal load rating at a zero speed frequency to about 10% of the nominal load rating at a full speed frequency. The threshold may, for example, vary linearly or quadratically with speed between the zero and full speed frequencies.

As mentioned above with reference to FIG. 3, operation below the underloading threshold may be required to persist for a predetermined duration. This duration may be, for example, a duration sufficient to reduce or prevent nuisance underloading faults during ramp-up operations. In some embodiments, however, this duration may also be set sufficiently long to prevent false identification of an underloading fault during other modes of operation. In particular, the underload protection circuitry described herein may be a general underload protection that is provided in operational modes beyond just ramp-up, such as in down transfers when the motor 20 is transitioned from bypass operation to operating under control of the converter circuit 110 to effect deceleration of the motor 20. In such a down transfer, the control circuit 120 may first activate the converter circuit 110 while the motor 20 is still on bypass to gain synchronization with the AC power source 10, but delay activation of the power devices (e.g., IGBTs) that drive the motor 20 until synchronization is achieved. During this synchronization period, the output of the converter circuit 110 could appear to be unloaded, which could inadvertently be interpreted as an underload fault condition. By providing an appropriate duration criterion for underload detection, this synchronization phase may end before the underload duration criterion is met, thus preventing the control circuit 120 from falsely determining that an underload fault is present.

The duration may be determined in any of a number of ways. For example, in some embodiments, a two-way duration timer may be used, wherein the timer counts up when the loading level is below the underloading threshold and counts down (i.e., instead of resetting to zero) when the loading level is above the underloading threshold. This can reduce or prevent accumulation of the duration timer for isolated excursions below the underloading, threshold, but still allow for identification of a fault if the loading level persistently vacillates around the underloading threshold. This can reduce or prevent nuisance operation of the underloading protection while still accurately detecting underloaded conditions.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Example embodiments herein with reference to block diagrams and/or flowchart illustrations. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a tangible or non-transitory computer-readable storage medium that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having tangible, non-transitory computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The terms "tangible" and "non-transitory," as used herein, are intended to describe a computer-readable storage medium (or "memory") excluding propagating electromagnetic signals but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM) Program instructions and data stored on a tangible computer-accessible storage medium in non-transitory form may further be transmitted by transmission media or signals such as electrical, electromagnetic, or digital signals; which may be conveyed via a communication medium such as a network and/or a wireless link.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of operating a variable frequency drive (VFD), the method comprising:
   operating a converter of the VFD in a ramp-up mode to produce an AC output voltage for ramping up a speed of a motor;
   determining a loading of the converter in the ramp-up mode; and
   conditioning transfer of the motor from the ramp-up mode to a bypassed mode in which the converter is bypassed and an AC source is connected to the motor on whether the determined loading in the ramp-up mode meets a criterion.

2. The method of claim 1, wherein conditioning transfer to the bypassed mode comprises foregoing transition to the bypassed mode based on a comparison of the determined loading to an underloading threshold.

3. The method of claim 2, wherein the underloading threshold corresponds to a level less than about 10% of a nominal load rating of the motor.

4. The method of claim 3, wherein the underloading threshold corresponds to a level between about 5% and about 10% of the nominal load rating of the motor.

5. The method of claim 4, wherein the underloading threshold varies with an output frequency of the converter.

6. The method of claim 5, wherein the underloading threshold corresponds to level of about 5% of the nominal load rating at around a zero speed frequency and a level of about 10% of the nominal load rating at around a full speed frequency.

7. The method of claim 1, wherein the criterion comprises a loading threshold.

8. The method of claim 7, wherein the criterion further comprises a duration of loading in a range defined by the loading threshold.

9. The method of claim 1, wherein conditioning transfer comprises disabling the converter responsive to the determined loading failing to meet the criterion.

10. The method of claim 9, further comprising indicating a fault responsive to the determined loading failing to meet the criterion.

11. A system comprising:
   a converter configured to drive a motor;
   a bypass switch configured to bypass the converter and connect an AC source to the motor; and
   a control circuit configured to operate the converter in a ramp-up mode to produce an AC output voltage for ramping up a speed of the motor, to determine a loading of the converter in the ramp-up mode and to condition transfer of the motor from the ramp-up mode to a bypassed mode in which the bypass switch bypasses the motor and connects an AC source to the motor based on whether the determined loading in the ramp-up mode meets a criterion.

12. The system of claim 11, wherein the control circuit is configured to forego transition to the bypassed mode based on a comparison of the determined loading to an underloading threshold.

13. The system of claim 12, wherein the underloading threshold corresponds to a level less than about 10% of a nominal load rating of the motor.

14. The system of claim 13, wherein the underloading threshold corresponds to a level between about 5% and about 10% of the nominal load rating of the motor.

15. The system of claim 14, wherein the underloading threshold varies with an output frequency of the converter.

16. The system of claim 15, wherein the underloading threshold corresponds to level of about 5% of the nominal load rating at around a zero speed frequency and a level of about 10% of the nominal load rating at around a full speed frequency.

17. The system of claim 11, wherein the criterion comprises a loading threshold.

18. The system of claim 17, wherein the criterion further comprises a duration of loading in a range defined by the loading threshold.

19. The system of claim 11, wherein the control circuit is configured to disable the converter responsive to the determined loading failing to meet the criterion.

20. The system of claim 19, wherein the control circuit is configured to indicate a fault responsive to the determined loading failing to meet the criterion.

* * * * *